United States Patent [19]

Koma

[11] Patent Number: 5,247,572
[45] Date of Patent: Sep. 21, 1993

[54] APPARATUS FOR CONTROL OF STORING INFORMATION INTO DIAL MEMORIES IN A TELEPHONE SET

[75] Inventor: Noriko Koma, Tokyo, Japan

[73] Assignee: NEC Corporation, Tokyo, Japan

[21] Appl. No.: 963,509

[22] Filed: Oct. 20, 1992

Related U.S. Application Data

[63] Continuation of Ser. No. 556,511, Jul. 24, 1990, abandoned.

[30] Foreign Application Priority Data

Jul. 24, 1989 [JP] Japan ................... 1-188806

[51] Int. Cl.$^5$ ........................................... H04M 11/00
[52] U.S. Cl. .................................... 379/356; 379/359; 379/354; 379/200
[58] Field of Search ............... 379/359, 360, 354, 355, 379/356, 216, 200

[56] References Cited

U.S. PATENT DOCUMENTS

| | | | |
|---|---|---|---|
| 4,243,845 | 1/1981 | Feinberg et al. | |
| 4,674,111 | 6/1987 | Monet et al. | 379/354 |
| 4,677,653 | 6/1987 | Weiner et al. | 379/59 |
| 4,723,265 | 2/1988 | Kamei et al. | 379/354 |
| 4,961,212 | 10/1990 | Marui et al. | 379/354 |
| 4,994,926 | 2/1991 | Gordon et al. | 358/436 |

FOREIGN PATENT DOCUMENTS

| | | |
|---|---|---|
| 3410569 | 9/1985 | Fed. Rep. of Germany . |
| 3410579 | 9/1985 | Fed. Rep. of Germany . |
| 3522107 | 1/1987 | Fed. Rep. of Germany . |
| 59-225696 | 12/1984 | Japan . |
| 1-090654 | 4/1989 | Japan . |
| 1-101052 | 4/1989 | Japan . |

OTHER PUBLICATIONS

European Search Report, Jun. 25, 1992, Examiner, De Haan A. J.

Primary Examiner—James L. Dwyer
Assistant Examiner—M. Shehata
Attorney, Agent, or Firm—Sughrue, Mion, Zinn, Macpeak & Seas

[57] ABSTRACT

A control signal generator is provided to supply a control signal to a control unit of a telephone set having dial memories. Information stored in a memory in the dial memories is forbidden to be erased, unless the control signal is supplied to the control unit. As a result, important information is protected from erroneous erasing in the dial memory.

16 Claims, 4 Drawing Sheets

APPARATUS FOR CONTROL OF STORING INFORMATION INTO DIAL MEMORIES IN A TELEPHONE SET

This is a continuation of application Ser. No. 07/556,511 filed Jul. 24, 1990 now abandoned.

FIELD OF THE INVENTION

This invention relates to an apparatus for control of storing information into dial memories in a telephone set, and more particularly to, a control apparatus for avoiding an unintentional erasing of information stored in dial memories in a telephone set.

BACKGROUND OF THE INVENTION

One type of a conventional apparatus for control of storing information into dial memories in a telephone set which is installed, for instance, in a car comprises a central processing unit (CPU), a read only memory (ROM) for storing a program, dial memories of a random access memory (RAM) having addresses designated by memory numbers, a key input unit for supplying the control unit with instruction by an operator, and a liquid crystal display (LCD) for displaying information stored in the dial memories.

In operation, when information such as a telephone number, a person's name, etc. is supplied from the key input unit to the control unit together with a memory number by an operator, an address of the dial memories designated by the memory number is accessed to check whether or not any information is stored in the addressed memory. If information is stored therein, the information is displayed on the LCD. Where the operator considers that the information may be erased, because it is not important, an erasing key provided on the key input unit is pressed on by the operator. Then, information supplied from the key input unit is written on the information stored in the addressed memory, so that the newly supplied information is stored in the addressed memory, while the formerly stored information is erased therefrom. On the other hand, where the operator considers the displayed information to be important, so that the operator does not want the stored information to be erased, the erasing key is not pressed on. Consequently, the important information is avoided from the erasing thereof.

Otherwise, when it is detected that no information is stored in the addressed memory, the newly supplied information is stored in that memory without any erasing key operation.

However, the conventional apparatus for control of storing information into dial memories in a telephone set has a disadvantage in that it is difficult to reliably avoid the erasing of important information, because erasing of any information (including writing of information on information to be erased) is carried out equally, regardless of the importance of stored information. In other words, information is written into dial memories equally, regardless of the importance of information to be stored. In order to surely avoid an erroneous erasing of important information, it is necessary that a memory number, by which a specific memory is designated to store important information, is always remembered. This is an additional disadvantage in the conventional apparatus for control of storing information into dial memories in a telephone set. In addition, even if the memory number is precisely remembered, the important information may be erased due to erroneous operation of a key on the key input unit. This is a further disadvantage.

SUMMARY OF THE INVENTION

Accordingly, it is an object of this invention to provide an apparatus for control of storing information into dial memories in a telephone set, in which important information is reliably avoided to be erased.

It is a further object of this invention to provide an apparatus for control of storing information into dial memories in a telephone set, in which it is not necessary to remember a memory number in avoiding an erroneous erasing of important information.

It is a still further object of this invention to provide an apparatus for control of storing information into dial memories in a telephone set, in which important information is not erased, even if a key is erroneously pressed on.

According to this invention, an apparatus for control of storing information into dial memories in a telephone set, comprises:

dial memories each having a memory number;
means for generating a predetermined control signal;
means for input of the memory number designating a memory selected from the dial memories, and of information to be stored into the selected memory; and
means for control of storing the information into said selected memory;
wherein the selected memory is controlled by the control means, so that information stored in the selected memory is erasable by receiving the predetermined control signal supplied from the generating means, thereby storing the information supplied from the input means, and the information stored in the selected memory is forbidden from erasing, when the predetermined control signal is not supplied from the generating means, thereby forbidding writing of the information supplied from the input means.

BRIEF DESCRIPTION OF THE DRAWINGS

This invention will be explained in more detail in conjunction with appended drawings, wherein.

DETAILED DESCRIPTION OF THE PREFERRED EMBODIMENT

Figure 1:
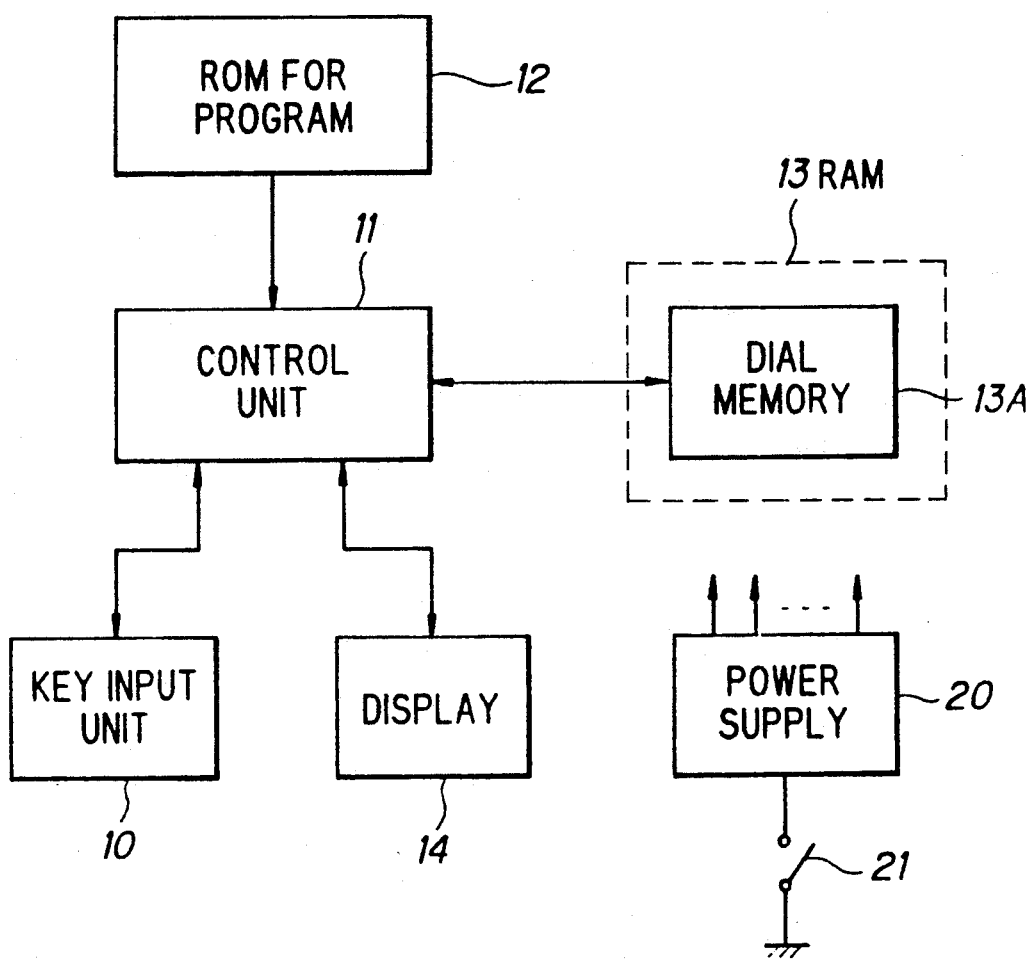
FIG. 1 is a block diagram showing a conventional apparatus for control of storing information into dial memories in a telephone set.
Figure 2:
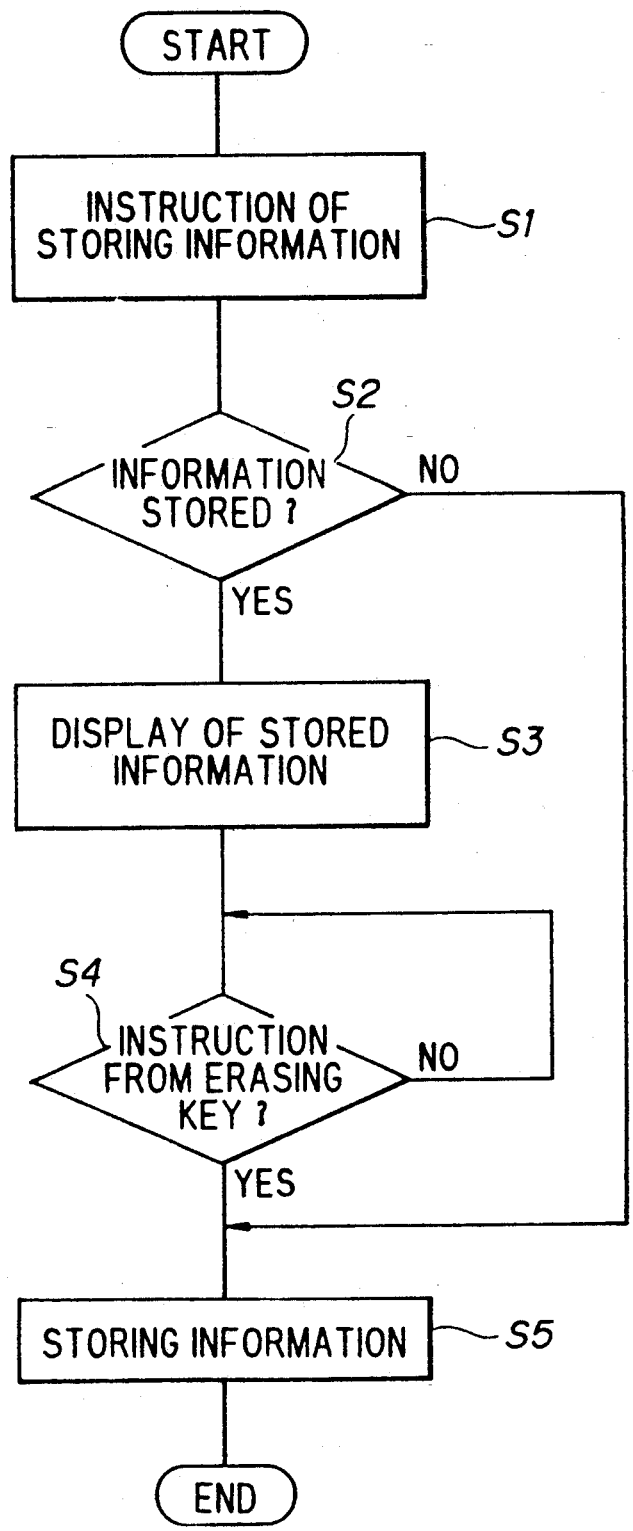
FIG. 2 is a flow chart showing operation in the conventional apparatus for control of storing information into dial memories in a telephone set.

Before explaining an apparatus for control of storing information into dial memories in a telephone set in the preferred embodiment according to the invention, the aforementioned conventional apparatus for control of storing information into dial memories in a telephone set will be again explained in FIGS. 1 and 2.

FIG. 1 shows the conventional apparatus which comprises a key input unit 10, a control unit 11, a ROM 12, a RAM 13 for dial memories 13A, an LCD 14, and a power supply 20 having a switch 21. The key input unit 10 includes ten key buttons, etc., such that various instructions such as storing information into the dial memories 13A, erasing information stored in the dial memories 13A, etc. are supplied from the key input unit 10 to the control unit 11. The dial memories 13A have a predetermined number of addresses designated by memory numbers of, for instance, "1" to "99". In the control unit 11, the instructions are processed by a program stored in the ROM 12, so that the dial memories 13A are controlled for writing and erasing of information. The LCD 14 is also controlled by the control unit 11, so that information stored in the dial memories 13A is displayed on the LCD 14.

FIG. 2 shows operation carried out by control of the control unit 11. At a step S1, an instruction of storing information including a telephone number and a person's name is supplied from the key input unit 10 to the control unit 11 by an operator. Simultaneously, a memory number, by which one of the dial memories 13A is addressed for writing of the information, is supplied to the control unit 11. At a step S2, it is checked whether or not information has been stored in the addressed memory of the dial memories 13A. Where information has been stored in the addressed memory (YES at the step S2), the stored information is displayed on the LCD 14 at a step S3. Then, the control unit 11 determines whether or not a key for erasing the stored information is pressed on by the operator at a step S4. When the key is detected to be pressed on (YES at the step S4), the supplied information is written on the stored information in the addressed memory at a step S5, so that the formerly stored information is erased to be replaced by the supplied information. On the other hand, where information has not been stored in the addressed memory (NO at the step S2), the supplied information is written to be stored therein at the step S5. As clearly understood from this operation, all information stored in the dial memories 13A is erased equally by pressing the erasing key on, regardless of the importance of the stored information. Therefore, the aforementioned disadvantages occur in the conventional apparatus for control of storing information into dial memories in a telephone set.

Next, an apparatus for control of storing information into dial memories in a telephone set in the preferred embodiment will be explained in FIGS. 3 and 4.

Figure 3:
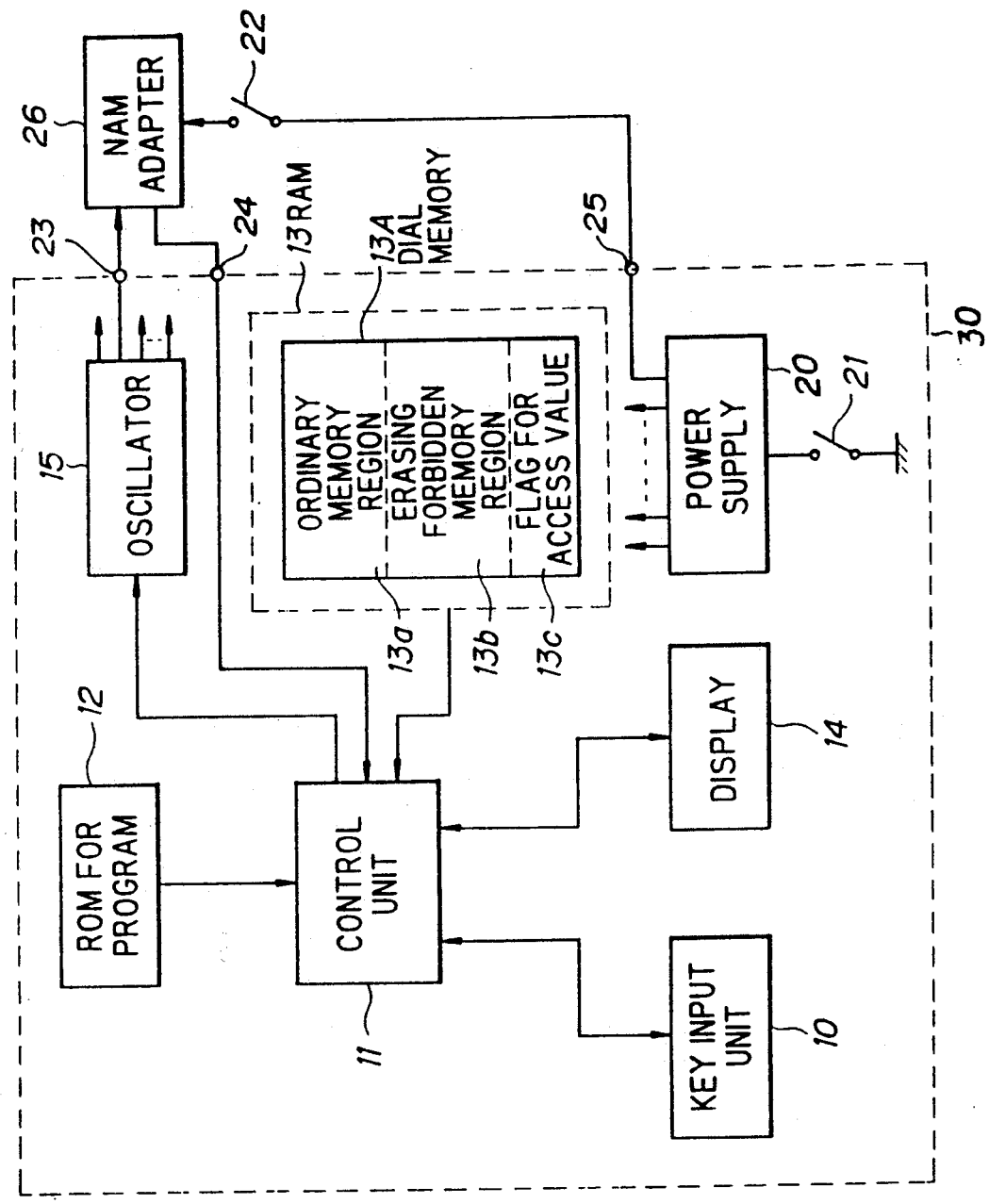
FIG. 3 is a block diagram showing an apparatus for control of storing information into dial memories in a telephone set in a preferred embodiment according to the invention.

FIG. 3 shows the apparatus for control of storing information into dial memories in a telephone set which comprises a key input unit 10, a control unit 11, a program ROM 12, a RAM 13 including dial memories 13A, and LCD 14, an oscillator 15 for generating a clock signal, a power supply 20 having a switch 21, and a NAM (Number Assignment Module) adapter 26. In this preferred embodiment, like parts are indicated by like reference numerals as used in FIG. 1. The key input unit 10, the control unit 11, the program ROM 12, the dial memories 13A, the LCD 14, and the oscillator 15 are included in a main unit 30 of a telephone set which is installed, for instance, in a car, and the NAM adapter 26 is connected to and disconnected from the main unit 30 by interfaces 23 and 24, and a power supply connector 25. The dial memories 13A have an ordinary memory region 13a, for instance, of 70 memories, an erasing forbidden memory region 13b, for instance, of 30 memories, and a flag region 13c for access value, and the NAM adapter 26 includes a sequence circuit (not shown) for generating a predetermined serial signal in synchronism with the clock signal supplied through the interface 23 from the oscillator 15, and a switch 22 which is turned on to receive an electric power from the power supply 20. Otherwise, the NAM adapter 26 may have an exclusive power supply instead of receiving an electric power from the power supply 20.

In operation, the NAM adapter 26 is connected to the main unit 30, and the switches 21 and 22 are turned on, for instance, at a car dealer factory. At first, a predetermined key operation is carried out on the key input unit 10 by an operator, so that instruction of storing information including a telephone number and a person's name, and a memory number designating a memory in the erasing forbidden memory region 13b are supplied from the key input unit 10 to the control unit 11. Simultaneously, a predetermined serial signal is supplied from the NAM adapter 26 through the interface 24 to the control unit 11 in synchronism with a clock signal supplied through the interface 23 from the oscillator 15. In the control unit 11, the predetermined serial signal is checked as to whether or not it coincides with a correct signal.

Figure 4:
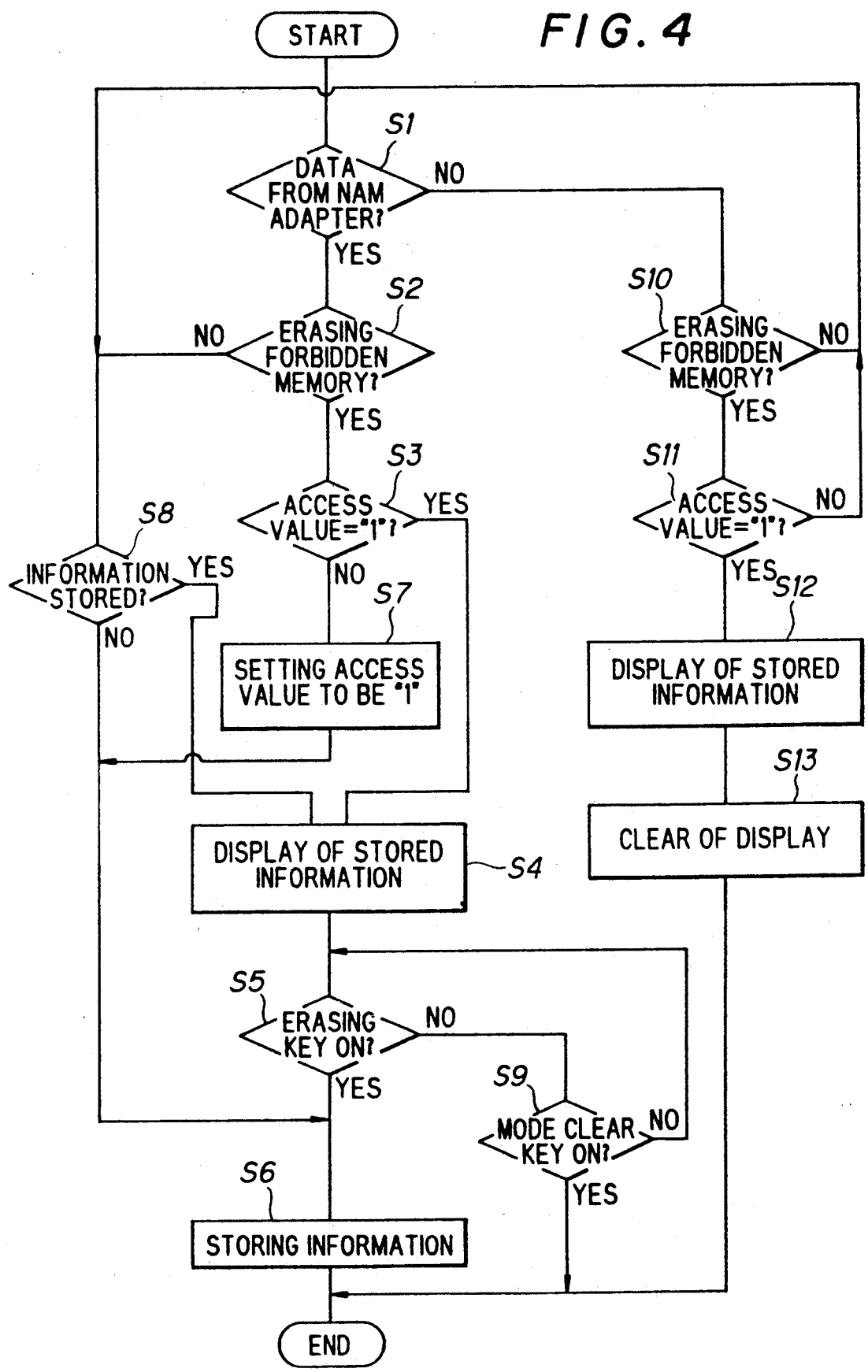
FIG. 4 is a flow chart showing operation in the preferred embodiment according to the invention.

FIG. 4 shows this operation at a step S1. When the predetermined signal coincides with the correct signal, the memory number which is supplied from the key input unit 10 is checked as to whether or not it corresponds to an address of a memory in the erasing forbidden memory region 13b at a step S2. When the memory number corresponds to the memory address, an access value of a flag corresponding to the designated memory is checked as to whether or not the access value is "1" in the flag region 13c at a step S3. Here, it is defined that, where an access value is "1" in a flag, information is stored in a memory corresponding to the flag. While, information is not stored in a memory, when an access value is "0" in a flag corresponding to the memory.

In the result of checking the access value at the step S3, information stored in the addressed memory is displayed on the LCD 14 at a step S4. Then, the operator presses an erasing key of the key input unit 10 on at a step S5, when the stored (displayed) information is not important, so that it may be erased. As a result, the supplied information is written on the stored information in the addressed memory, so that the new information is stored therein, in place of the formerly stored information which is automatically erased at a step S6.

At the step S3, when the access value is not "1", that is, the access value is "0", the access value is set to be "1" in the corresponding flag of the flag region 13c at a step S7. Then, the supplied information is stored in the addressed memory of the erasing forbidden memory region 13b having no information at the step S6.

On the other hand, when a dial memory addressed by the memory number does not belong to the erasing forbidden memory region 13b, but to an ordinary memory region 13a at the step S2, it is checked as to whether or not information is stored in the addressed memory at a step S8. When information is stored in the addressed memory, it is displayed at the step S4, and the newly supplied information is stored in the addressed memory at the step S6 in accordance with "YES" at the step S5. Otherwise, information is not stored in the addressed memory at the step S8, the newly supplied information is stored in the addressed memory having no information at the step S6.

When the erasing key is not pressed on in accordance with the importance of the stored information at the step S5, it is checked as to whether or not a mode clear key of the key input unit 10 is pressed on at a step S9. When this mode clear key is pressed on at this step S9, the operation finishes without storing the newly supplied information, so that the information which has been stored in the addressed memory of the ordinary memory region 13a or the erasing forbidden memory region 13b is maintained therein. Otherwise, when the mode clear key is not pressed on at the step S9, a state "WAIT" continues at the step S5.

In this manner, predetermined information is written into dial memories of the ordinary memory region 13a and the erasing forbidden memory region 13b to be stored therein, for instance, at the car dealer factory. Especially, important information is stored in dial memories of the erasing forbidden memory region 13b.

Then, a car will be delivered to a user in a state that the NAM adapter is disconnected from the main unit 30.

In accordance with information including a telephone number and a person's name, and a memory number, respectively, supplied from the key input unit 10, for instance, by the car user, operation starts as explained FIG. 4. In the state that the NAM adapter is not connected to the main unit 30, a predetermined serial signal is no longer supplied from the NAM adapter 26 to the control unit 11. Therefore, "NO" is met at the step S1. Then, a dial memory which is addressed by the memory number is checked as to whether or not the addressed memory belongs to the erasing forbidden memory region 13b at a step S10. When the addressed memory is not a dial memory in the erasing forbidden memory region 13b, operation following the aforementioned step S8 starts. Otherwise, when the addressed memory is a dial memory in the erasing forbidden memory region 13b, an access value of a flag corresponding to the addressed memory is checked in the flag region 13c as to whether or not the access value is "1" at a step S11. When the access value is "1" in this check, information which has been stored in the addressed memory is displayed on the LCD 14 at a step S12, and then cleared after a limited duration to definitely forbid the writing of the supplied information at a step S13. Consequently, the information stored in the addressed memory is completely avoided to be erased, for instance, by the car user. At the step S11, when the access value is not "1", that is, no information is stored in the addressed memory, operation following the aforementioned step S8 starts.

In this preferred embodiment, where dial memories 13A are composed of nonvolatile memories such as EPROM (Erasable and Programmable Read Only Memory), etc., contents of the dial memories 13A are held, even if a power supply for a telephone set is turned off. The above explained operation is summarized as follows.

| NAM ADAPTER 26 | ORDINARY MEMORY 13a | | ERASING FORBIDDEN MEMORY 13b | |
|---|---|---|---|---|
| | INFORMATION STORED | NO INFORMATION STORED | ACCESS VALUE = 1 | ACCESS VALUE = 0 |
| ON | ERASABLE BY KEY | WRITABLE | ERASABLE BY KEY IMPOSSIBLE TO | WRITABLE SAME AS |
| OFF | SAME AS ABOVE | SAME AS ABOVE | | |

| NAM ADAPTER 26 | ORDINARY MEMORY 13a | | ERASING FORBIDDEN MEMORY 13b | |
|---|---|---|---|---|
| | INFORMATION STORED | NO INFORMATION STORED | ACCESS VALUE = 1 | ACCESS VALUE = 0 |
| | | | ERASE STORED INFORMATION | ABOVE |

Although the invention has been described with respect to specific embodiment for complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for control of storing information into dial memories in a telephone set, comprising:
    a main unit; and
    a number assignment module, connectable and disconnectable to said main unit, for receiving a clock signal and for generating an identification number signal in response to said clock signal;
    wherein said main unit comprises:
        dial memories each having a memory number;
        means for receiving said identification number signal supplied from said number assignment module when connected to said main unit and for checking coincidence of said identification number signal with a predetermined reference number signal of said main unit;
        means for input of said memory number designating a memory selected from said dial memories, and of information to be stored into said selected memory; and
        means for control of storing said information into said selected memory;
    wherein said selected memory is controlled by said control means, so that information stored in said selected memory is erasable in the presence of coincidence of said identification number signal with said predetermined reference number signal, thereby storing said information supplied from said input means, and said information stored in said selected memory is prevented from being erased in the absence of coincidence of said identification number signal with said predetermined reference number signal, thereby preventing writing of said information supplied from said input means.

2. An apparatus for control of storing information into dial memories in a telephone set, according to claim 1, wherein:
    said dial memories are divided into two memory regions, said selected memory belonging to one of said two memory regions, and information stored in any memory belonging to the other of said two memory regions is erasable, regardless of whether said number assignment module is connected to said main unit.

3. An apparatus for control of storing information into dial memories in a telephone set, according to claim 1, wherein:

said input means includes an erasing key for erasing said information stored in said selected memory.

4. An apparatus for control of storing information into dial memories in a telephone set, according to claim 1, further comprising:
means for displaying said information stored in said selected memory which is erased to be replaced by said information supplied from said input means.

5. An apparatus for control of storing information into dial memories in a telephone set, according to claim 1, wherein:
said dial memories are divided into two memory regions, said selected memory belonging to one of said two memory regions, and information stored in any memory belonging to the other of said two memory regions is erasable, regardless of presence of coincidence between said identification number signal and said predetermined reference number signal.

6. An apparatus comprising:
memory means for storing data;
means for receiving a repetitive serial identification number signal and for checking coincidence of said identification number signal with a predetermined reference number signal to continuously produce a control signal while said coincidence is present;
means for producing an erasing signal;
means responsive to said control and erasing signals for erasing data stored in said memory means; and
means for preventing said erasing means from erasing data out of said memory means in the absence of said control signal.

7. An apparatus as claimed in claim 6, wherein said memory means comprises first and second parts storing first and second data, respectively, said first data being erased in response to said erasing signal irrespective of said control signal, said second data being not erased in the absence of said control signal.

8. An apparatus as claimed in claim 6, further comprising:
means for generating a predetermined clock signal; and
means for generating said identification number signal in in synchronism with said predetermined clock signal.

9. An apparatus as claimed in claim 6, wherein said producing means comprises a key for manually producing said erasing signal.

10. An apparatus as claimed in claim 6, wherein said memory means comprises an EPROM.

11. A method of preventing data stored in a memory from being erased, said method comprising the steps of:
(a) receiving input information and a memory number;
(b) receiving an identification number signal;
(c) determining whether the identification number signal coincides with a predetermined reference signal;
(d) determining whether the memory number corresponds to a forbidden region of the memory; and
(e) storing the input information in the forbidden region of the memory only when coincidence is determined in step (c).

12. A method as claimed in claim 11,
wherein said method further comprises the steps of:
(f) receiving, prior to step (e), an erasing signal; and
(g) storing the input information in regions of the memory other than the forbidden region regardless of whether coincidence is determined, and
wherein said storing step (e) is performed in accordance with the erasing signal.

13. A method as claimed in claim 11, wherein said storing step (e) comprises the step of forbidding the information previously stored in the forbidden region of the memory from being erased when a lack of coincidence is determined in step (c).

14. A method of preventing data stored in a memory from being erased, comprising the steps of:
receiving a repetitive serial identification number signal;
generating an erasing signal;
continuously determining coincidence of said identification number signal with a predetermined reference number signal;
erasing data stored in said memory in accordance with said erasing signal while said coincidence is present; and
preventing data stored in said memory from being erased if a lack of coincidence is determined.

15. A method as claimed in claim 14, wherein said receiving step comprises the steps of:
generating a clock signal; and
in synchronism with said clock signal, generating said identification number signal.

16. An apparatus comprising:
memory means for storing data, said memory means comprising a first part for storing first data and a second part for storing second data;
means for receiving an identification number signal and for checking coincidence of said identification number signal with a predetermined reference number signal to produce a control signal when said coincidence occurs;
means for producing an erasing signal;
means responsive to said control signal and said erasing signal for erasing said first and second data stored in said memory means; and
means for preventing said erasing means for erasing said second data from said memory means in the absence of said control signal.

* * * * *